(12) United States Patent
Bryan (10) Patent No.: US 6,870,370 B2
(45) Date of Patent: Mar. 22, 2005

(54) ELECTROMAGNETIC INDUCTION DETECTION SYSTEM

(75) Inventor: Melissa Whitten Bryan, Albany, GA (US)

(73) Assignee: Agri Dynamics, Inc., Albany, GA (US)

( * ) Notice: Subject to any disclaimer, the term of this patent is extended or adjusted under 35 U.S.C. 154(b) by 50 days.

(21) Appl. No.: 10/616,466

(22) Filed: Jul. 9, 2003

(65) Prior Publication Data

US 2004/0051619 A1 Mar. 18, 2004

Related U.S. Application Data

(60) Provisional application No. 60/395,089, filed on Jul. 10, 2002.

(51) Int. Cl.[7] .................................................. G01V 3/11
(52) U.S. Cl. ........................ 324/331; 324/326; 324/330
(58) Field of Search ................................ 324/323, 326, 324/327–329, 330–331, 334

(56) References Cited

U.S. PATENT DOCUMENTS

| | | | |
|---|---|---|---|
| 5,506,506 A | * | 4/1996 | Candy .......................... 324/329 |
| 5,729,143 A | | 3/1998 | Tavernetti et al. |
| 5,786,696 A | * | 7/1998 | Weaver et al. ............... 324/329 |
| 6,026,135 A | | 2/2000 | McFee et al. |
| 6,473,025 B2 | | 10/2002 | Stolarczyk et al. |
| 6,559,645 B2 | | 5/2003 | Arndt et al. |
| 2003/0016131 A1 | * | 1/2003 | Nelson ........................ 340/551 |

* cited by examiner

*Primary Examiner*—Bot LeDynh
(74) *Attorney, Agent, or Firm*—Thomas C. Saitta (57) ABSTRACT

A airborne electromagnetic induction (EMI) detection apparatus and system. In accordance with one embodiment, the EMI detection apparatus includes a transmitter element in the form of a transmitter coil that emits a primary, multi-frequency component magnetic field which induces a secondary magnetic field in an external body. A receiver element in the form of a receiver coil is mounted in a horizontal loop-loop orientation with respect to the transmitter coil and receives the secondary magnetic field. The detection apparatus further includes a magnetic shield disposed around the receiver coil to limit the lateral footprint diameter observed by the receiving element and to shield the receiver coil from the primary magnetic field and other external electromagnetic radiation to improve the gain and resolution of the detection apparatus.

11 Claims, 4 Drawing Sheets

ELECTROMAGNETIC INDUCTION DETECTION SYSTEM

CROSS REFERENCE TO RELATED APPLICATIONS

This application claims the benefit of and priority from U.S. provisional patent application Ser. No. 60/395,089 and filed on Jul. 10, 2002, the content of which is incorporated herein in its entirety.

BACKGROUND OF THE INVENTION

1. Technical Field

The present invention relates generally to detecting electromagnetic induction sensing and processing, and in particular, to a mobile and compact electromagnetic induction sensing system that may be utilized in overhead detection applications for detecting small discrete objects such as landmines.

2. Description of the Related Art

Electromagnetic induction (EMI) detection techniques are applied in a variety of contexts including non-destructive testing of manufactured objects, mineral exploration, treasure hunting, security checkpoints, and detection of mines and unexploded ordinance (UXO). The hand-held metal detector used for treasure hunting as well as landmine sweeping is a familiar example of an EMI sensor. The operation of EMI sensors is based on principles of electromagnetic induction in which one or more inductor coils are utilized to interact with buried or otherwise hidden metallic elements or objects. Specifically, an EMI sensor includes a transmitter coil that emits a primary magnetic field into the surrounding environment (a ground surface or container, for example). The primary magnetic field induces eddy currents within nearby electromagnetic reactive elements, resulting in emission of a secondary magnetic field which is measured by the EMI sensor as an electric potential or electromotive force across a receiver coil. For ease of reference, the terms "EMI sensor," "EMI detector," and "metal detector" are utilized herein synonymously throughout.

The metal detectors used for mine and UXO detection are remarkably sensitive, capable of detecting buried objects containing less than a gram of metal. Therefore, even with the advent and increasing utilization of low metallic content mines and other ordinance, EMI sensors remain a staple in the field of mine and UXO detection. The basic objectives of detection using EMI sensors include obtaining the highest probability of detection ($P_d$) and the lowest false alarm rate. Furthermore, for wide area assessment there is an increasing interest in the speed at which an area can be covered.

EMI mine and UXO detection may be deployed using hand-held, ground based vehicle-mounted or airborne detectors. Vehicular-mounted EMI detection provides faster ground coverage but is limited to vehicle-accessible terrain. Although effective for reliable detection over terrain inaccessible by vehicle, hand-held EMI sensors pose the highest risk of human injury of any of the methods and are ineffective for providing rapid assessments of vast areas such as is often encountered during or after wartime conditions in which minefields may span hundreds or thousands of square miles. Furthermore, some terrain conditions such as mine or UXO contaminated underwater or wetland environments may preclude use of either vehicle-mounted or hand-held EMI detection.

Airborne electromagnetic induction (A-EMI) in which the detector is mounted to the underside of an aircraft, such as a helicopter or fixed-wing airplane, is effective for determining apparent conductivity in near-surface geophysical studies. A-EMI induction systems are currently used in many areas of environmental and geophysical exploration including detection of mineral deposits, saltwater intrusion studies, and petroleum exploration. Conventional A-EMI detectors provide much faster ground coverage but have a lower $P_d$ when used for individual landmine or UXO detection than the other two methods. A problem with conventional A-EMI sensing methods when applied to mine and UXO detection is that the altitude distance between the detector and the ground surface results in a lateral "footprint" of the receiver coil being on the order of tens of meters. Because the sensor response is averaged over the receiver footprint, adequate resolution is not provided for relatively small conductive or dielectric objects such as landmines. Furthermore, A-EMI systems are physically unable to gain close proximity to the ground in order to reduce the size of the footprint and therefore increase resolution.

It can therefore be appreciated that a need exists for an improved A-EMI sensing apparatus and system that enables rapid, scalable detection and imaging to provide accurate and rapid detection of mines, UXO and the like. The present invention addresses such a need.

SUMMARY OF THE INVENTION

A airborne electromagnetic induction (EMI) detection apparatus and system are disclosed herein. In accordance with one embodiment, the EMI detection apparatus includes a transmitter element in the form of a transmitter coil that emits a primary, multi-frequency component magnetic field which induces a secondary magnetic field in an external body. A receiver element in the form of a receiver coil is mounted in a horizontal loop-loop orientation with respect to the transmitter coil and receives the secondary magnetic field. The detection apparatus further includes a magnetic shield disposed around the receiver coil to limit the lateral footprint diameter observed by the receiving element and to shield the receiver coil from the primary magnetic field and other external electromagnetic radiation to improve the gain and resolution of the detection apparatus.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF A PREFERRED EMBODIMENT

The present invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. For example, although the figures depict the system of the present invention as deployed using aircraft transport and positioning, it should be noted that the more general inventive principles taught herein are more broadly applicable to any above-surface transport device.

The present invention is directed in general to an improved electromagnetic induction (EMI) system that enables near placement of the detector to a volume being examined and the detection, recording, and processing of collected secondary magnetic field data. Specifically, the present invention is directed to an apparatus, system and method for improving response resolution when performing overhead scan EMI detection for mines, unexploded ordinance (UXO), or other relatively small submerged or buried objects. Previous problems with airborne systems used to locate landmines and unexploded ordinance has been that the airborne system has a footprint on the order of meters. Because the response is an average over the entire footprint, a target measuring on the order of inches cannot be discriminated from other signals in the footprint. The present invention overcomes this problem by suspendedly flying an EMI detector from a specified height, typically within a meter, from the ground.

The invention dramatically reduces the lateral detection footprint of an A-EMI detection system, thus, making the system practical for use in locating landmines and UXO. This system furthermore employs a method of analyzing data from the search area that enables researchers to model the region on a multiple-layer level in a timely fashion such that more information is obtained from each survey.

In one embodiment, referred to herein as an airborne EMI detection system, a remote-controlled drone helicopter is utilized to fly the detector as EMI measurements are taken. The relatively small and maneuverable drone tows an EMI detector platform that includes a transmitter and a receiver coil. As explained below with reference to the figures, the receiver coil is surrounded by a magnetic shield, which reduces the lateral footprint through which a secondary magnetic field is received by the receiver coil, enabling the detector system to detect relatively small objects as it travels in a given direction at a given speed. Furthermore, the magnetic shield reduces the effect of the primary magnetic field emitted from the transmitter coil on the system response in addition to shielding the receiver coil from other sources of electromagnetic interference. In a preferred embodiment, the electromagnetic data obtained from the secondary magnetic field response are processed using a modified Marquardt-Levenberg type nonlinear least squares inversion algorithm to calculate the resulting conductivities at corresponding depths for each data collection point.

Figure 1:
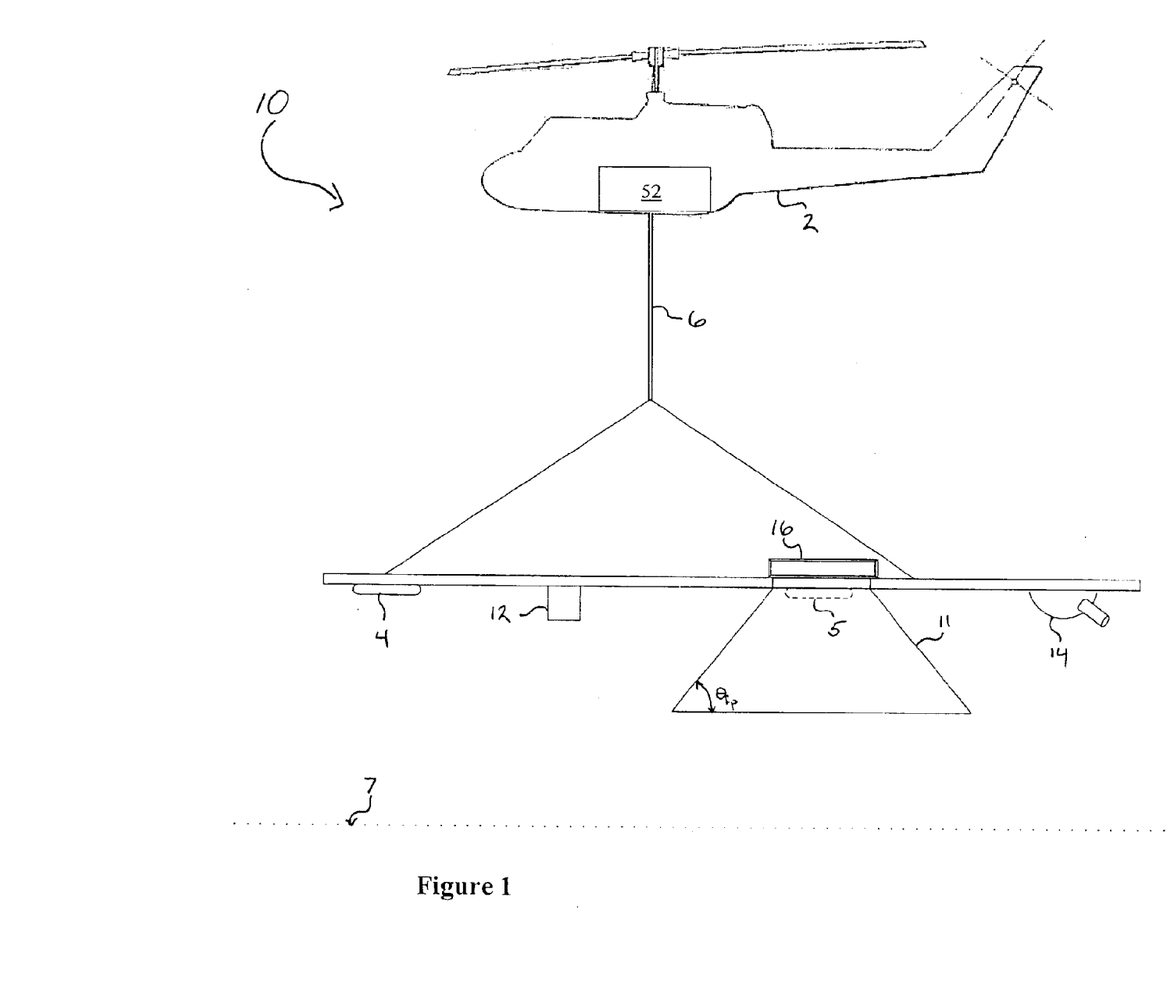
FIG. 1 depicts an airborne electromagnetic induction (A-EMI) detection system in accordance with one embodiment of the present invention.

With reference now to the figures, wherein like reference numerals refer to like and corresponding parts throughout, and in particular with reference to FIG. 1, there is illustrated an airborne EMI (A-EMI) detection system 10 in accordance with one embodiment of the present invention. A-EMI detection system 10 is designed to detect sub-surface objects, such as landmines or UXO objects, in a discrete, individualized manner while traversing at a given speed in a linear path over the object field surface 7. To this end, A-EMI detection system 10 includes a flying transport craft which may be a fixed wing airplane or a helicopter. In a preferred embodiment, the transport craft is a remote-controlled helicopter drone 2 having a compact design providing optimal maneuverability over rugged terrain and under power lines and tree limbs, for example. Drone helicopter 2 preferably has an approximate rotor diameter of 1.34' and is capable of carrying a usable payload of about 22 lbs. Drone helicopter 2 is further preferably designed to maintain flying speeds between 15 mph and 20 mph (ideally 17 mph) while collecting EMI data.

Suspended below helicopter drone 2 is a horizontal coplanar coil EMI sensor apparatus that utilizes electromagnetic induction principles to detect and map the location of buried landmines and the like. In accordance with well-known EMI detection techniques, inductive coils are utilized to induce and detect electromagnetic fields. Specifically, a current-carrying transmitter coil 4 acts as a magnetic dipole that generates a primary magnetic field, $H_p$, proportional to a magnetic dipole moment, $\mu=NIA$, where A is the area of the loops of transmitter coil 4, I is the current through the loops, and N is the number of loops in the coil. The primary magnetic field induces eddy currents in magnetic field-reactive bodies or targets (not depicted) within a volume located a specified distance from the transmitter coil. The induced currents in the volume in turn generate a secondary magnetic field, $H_s$, which is detected as a changing electric potential, or electromotive force, in a receiver coil 5 above the volume. The ratio of $H_s$ to $H_p$ is called the mutual coupling ratio, Q, and is the quantity utilized by an EMI system utilized to detect the location of buried magnetic objects.

Figure 2:
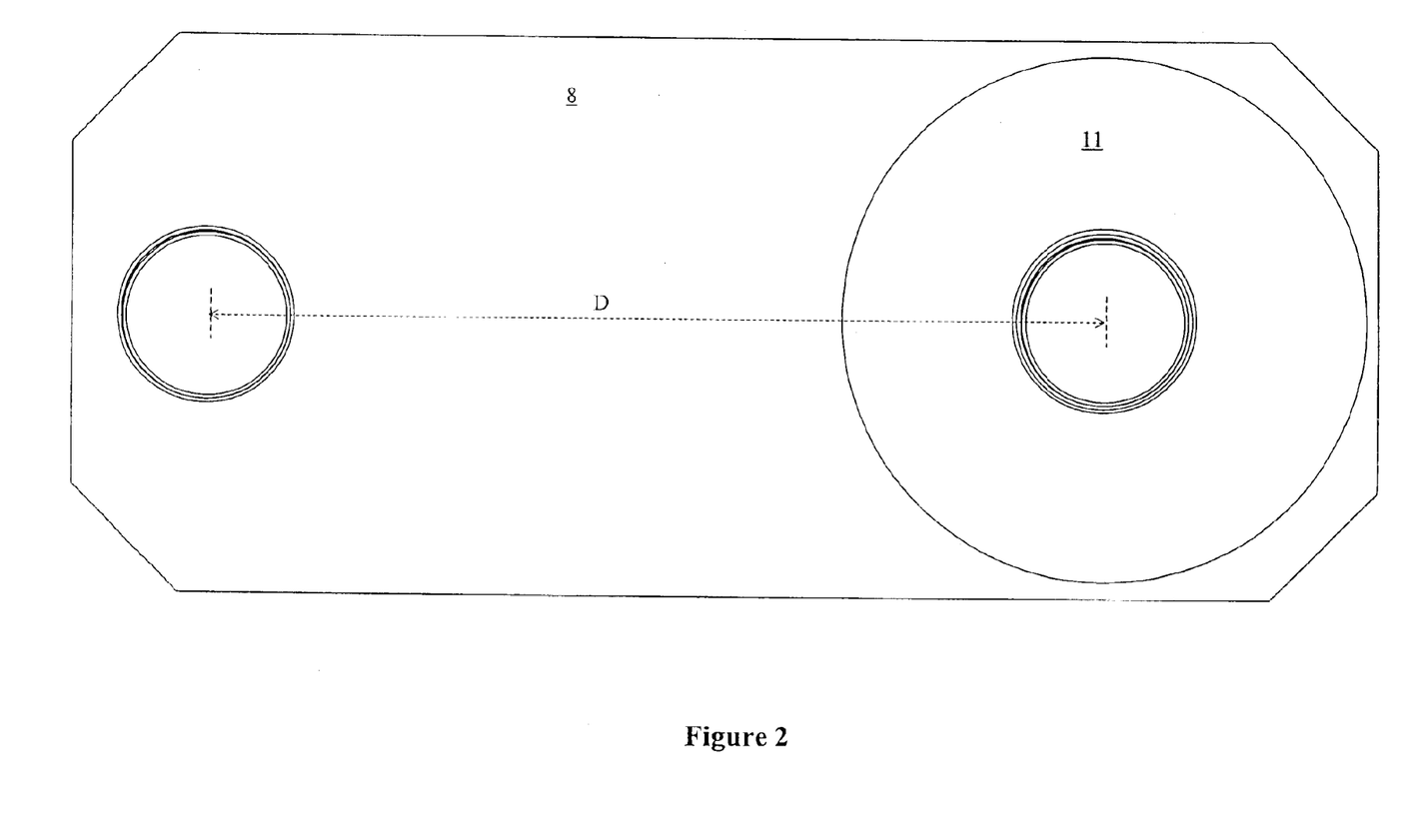
FIG. 2 is an underneath view of an electromagnetic induction detection platform incorporated in the A-EMI detection system of FIG. 1 and showing the relative disposition of transmit and receive coils.

For the horizontal coplanar coil configuration depicted in FIGS. 1 and 2, also known as a vertical dipole configuration, Q is given by:

$$Q = H_s/H_p = -r^3 \int \lambda^2 R(\lambda) J_0(\lambda r) e^{-2\lambda h} d\lambda,$$

wherein R represents the total complex distance between the primary dipole and the secondary dipole in the conductor, h is the detector height above the ground, $J_0$ is the $0^{th}$ order Bessel function, and the integration limits are taken over the coil separation, r, from r=0 to r−∞. The mutual coupling ratio is measured for a particular frequency, and inversion of the equation for Q gives $R(\lambda)$, from which the embedded parameters of apparent conductivity, $\sigma_a$, and skin depth, $\delta_s$, are obtained. The apparent conductivity and skin depth parameters, $\sigma_a$ and $\delta_s$, are dependent on coil separation, height of the detector and the transmitter frequency.

The EMI sensor apparatus depicted in FIG. 1 comprises a loop-loop horizontal coplanar set of transmitter and receiver coils mounted on a non-conductive EMI detection platform 8 that is towed below the remote-controlled drone helicopter 2 using a cable 6 or other suitable suspension support member. Specifically, and referring to the underneath profile depiction of EMI detection platform 8 shown in FIG. 2 in conjunction with FIG. 1, the EMI sensor apparatus includes a small-diameter transmitter coil 4 and a small-diameter receiver coil 5 both mounted to the underside surface of EMI detection platform 8, which is preferably constructed of a light, non-conductive material such as light plastic polymers.

Transmitter coil 4 and receiver coil 5, having respective, specified radii and numbers of loops are mounted on EMI detection platform 8 using epoxy glue or other suitable adhesive or mechanical fastening means. The windings of transmitter and receiver coils 4 and 5 are formed such that the respective coil radii are held in exact circular uniformity and the concentricity of the coil loops is maintained.

As further depicted in FIGS. 1 and 2, receiver coil 5 is displaced by a specified distance, D, from transmitter coil 4 as measured between the respective coil centers. The dimensions and relative positioning of transmitter and receiver coils 4 and 5 is significant to A-EMI detection because receiver coil 5 measures the in-phase (real) and quadrature (imaginary) components of the secondary (induced) field in terms of a percentage of the primary (source) field. Transmitter and receiver coils 4 and 5 are preferably mutually positioned on EMI detection platform 8 in a manner that maximizes this ratio. Preferably, the coil separation D is small compared to the skin depth of the system, such that the primary field is reduced in the detected signal and the value of Q is greater. The horizontal coplanar mode has a maximum sensitivity to conductive layers at a depth of about 0.4 times the coil separation. Furthermore, the displacement D between the centers of transmitter coil 4 and receiver coil 5 is preferably maximized to the extent practicable on EMI detection platform 8 to reduce the source field's detection by receiver coil 5 and further maximize Q. Additionally, the spacing distance D between the coils must be less than the height of receiver coil 5 from the ground surface 7. Typically, the detector is flown at a height of about 10–20" from the ground, with the distance D between transmitter and receiver coils 4 and 5 preferably set between 15"–20" to give a maximum sensitivity at a depth of penetration of about 6" to 8".

Transmitter and receiver coils 4 and 5 preferably have a radius of about 0.5". Unshielded, the receiver footprint diameter grows in proportion to height of the detector apparatus above the ground (approximately 19" with the detector less than 20" from the ground). As explained in further detail below, a magnetic shield 11 is deployed around receiver coil 5 to absorb or deflect unwanted secondary field values to limit the footprint size. The reduced lateral footprint area resulting from magnetic shield 11 enables the EMI detection apparatus to maintain adequate resolution when the detection platform 8 is flown at a higher altitude over rugged or obstacle-filled terrains.

As further depicted in FIGS. 1 and 2, and in a preferred embodiment of the present invention, receiver coil 5 is mounted within the inner volume of magnetic shield 11, which protrudes downwardly from the underneath surface of EMI detection platform 8. Its constituent materials and contour enable magnetic shield 11 to limit the lateral footprint, i.e. surface area of incoming magnetic field exposure, of receiver coil 5 to a specified width suitable for detecting EMI reactive objects having dimensions on the order of inches. Magnetic shield 11 may be constructed entirely of a magnetic shielding material such as aluminum, or in the alternative may be constructed of a lightweight non-conductive material layered with magnetic shielding material. Secure attachment to platform 8 may be achieved by inserting an outer sleeve of magnetic shield 11 into a circular hole within EMI detection platform 8 using epoxy glue or other suitable adhesive or mechanical fastener means such that receiver coil 5 is maintained level, i.e. coplanar, with respect to transmitter coil 4.

The effective resolution of the EMI detection apparatus is significantly increased by the disposition of magnetic shield 11 around receiver coil 5 in a two-fold manner. Specifically, in addition to limiting the lateral footprint observed by receiver coil 5, the disposition of magnetic shield 11 around receiver coil 5 serves to greatly reduce or eliminate the primary magnetic field and environmental sources of electromagnetic noise received by receiver coil 5. As depicted in FIGS. 1 and 2, magnetic shield 11 is preferably cone or frustum contoured. However, magnetic shield 11 may be implemented using other shapes and contours without departing from the spirit or scope of the present invention.

In a preferred embodiment, the slope angle of the side of magnetic shield 11 is such that the angle, $\theta_{fp}$, between the shield side and the footprint surface (as represented by the open mouth surface area bounded by the rim of magnetic shield 11) is between 28° and 90°. At 28°, none of the secondary magnetic field lateral footprint is shielded due to the field characteristics of the secondary field which leaves an angle between the footprint and the ground of approximately 28°. At 90°, wherein the shield is effectively a cylinder around receiver coil 5, nearly all of the secondary magnetic field response is blocked.

In combination, the relative positioning of transmitter coil 4 and receiver coil 5, in which the coils are mutually separated as much as is practicable on EMI detection platform 8, and shielding function provided by magnetic shield 11, minimizes the effect of the primary magnetic field and noise on the response signal received by receiver coil 5, thereby improving resolution by maximizing the detected ratio of the secondary magnetic field to the primary magnetic field.

As further illustrated in FIG. 1, a dual-frequency global positioning system (GPS) receiver 16 is mounted on EMI detection platform 8 directly above receiver coil 5. In accordance with well-known GPS technology, GPS receiver 16 receives longitude, latitude and altitude information from a set of GPS satellites (not depicted). As explained in further detail with reference to FIG. 3, the spatial position information collected by GPS receiver 16 is advantageously utilized for mapping the collected EMI data points.

Figure 3:
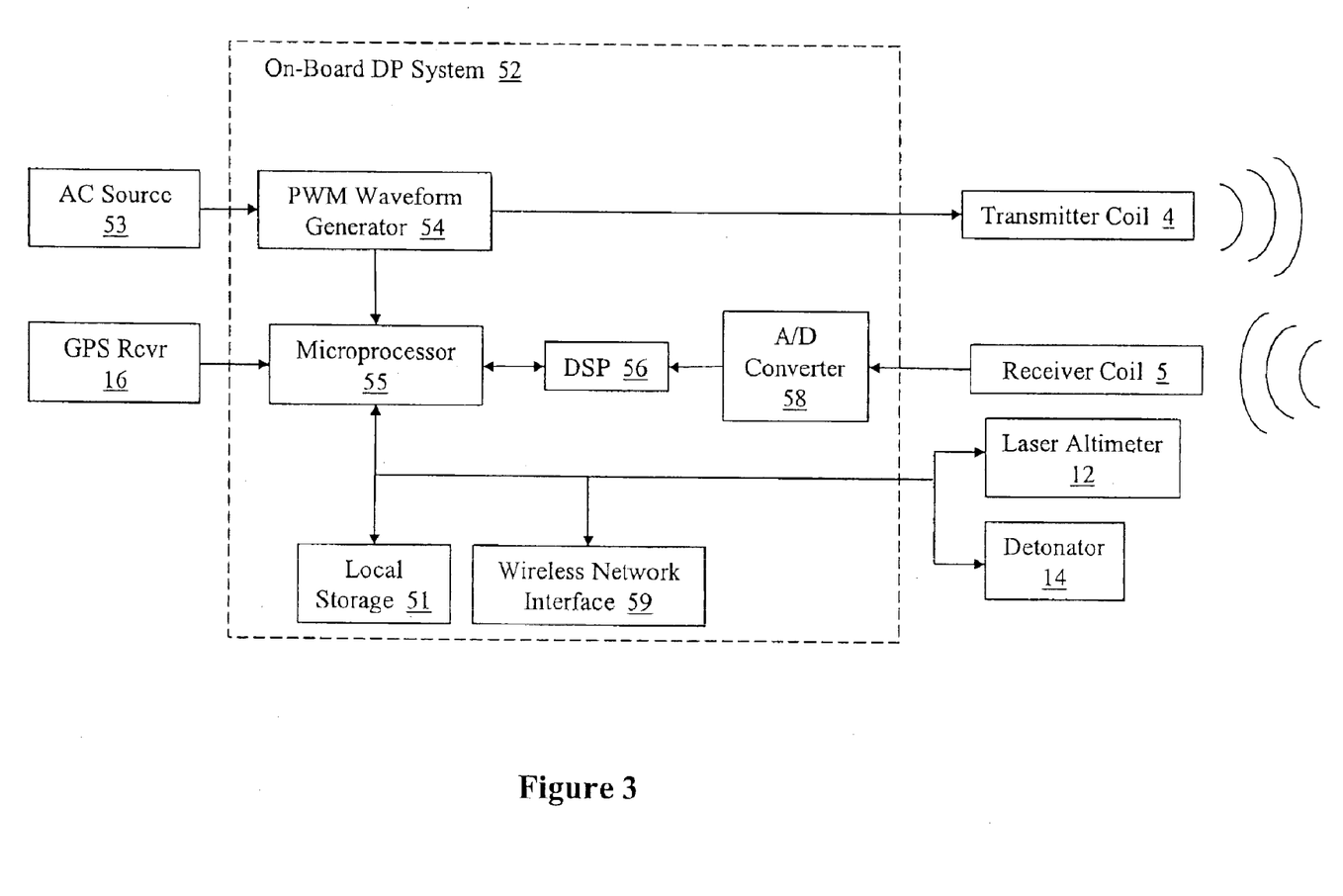
FIG. 3 is a block diagram illustrating the interfacing of signal and data processing elements included within an A-EMI detection system in accordance with one embodiment of the present invention.

Also mounted on EMI detection platform 8 are a detonator device 14 and an altimeter device 12. Detonator device 14 may be advantageously utilized in conjunction with the spatial position data provided by GPS receiver 16 and target detection data to detonate or otherwise neutralize landmines or UXO detected by the EMI detection apparatus. Detonator device 14 may be a small-caliber gun, such as a .22 caliber gun, which is lightweight and uses lightweight ammunition. In the alternative, detonator device 14 may be a high-power laser or a device that controllably emits a high-energy sonic boom as a detonation mechanism. Regardless of the detonation mechanism employed, and as depicted in FIG. 3, detonator device 14 receives targeting instructions in accordance with current position data from GPS receiver 16 as well as target position information from a host data processing system 52 within helicopter drone 2 enabling detonator device 14 to accurately aim and strike detected targets. Altimeter device 12 is preferably a laser altimeter that detects and reports to data processor 52, the current height of platform 8 above the ground surface 7 thereby enabling helicopter drone 2 to adjust its altitude as necessary over, for example, uneven or steeply sloping terrain.

Differing conductive properties of elements fluxed by the primary magnetic field affect the response detected by receiver coil 5. Even dielectric materials cause anomalies in the detected secondary magnetic field when exposed to a high frequency source. Thus, a broad range of frequencies must be considered in a multiple frequency electromagnetic induction system in order to exploit the dielectric properties of less conductive materials in the volume below a receiver coil. These changes in the responses from a dielectric material are detectable and are evident in the processed data.

The present invention exploits the frequency response characteristics of different materials and furthermore uses multi-frequency induction and data processing techniques to accurately detect objects at different ground depths. With reference to FIG. 3, there is depicted a block diagram illustrating the interfacing of signal and data processing elements included within A-EMI detection system 10 in accordance with one embodiment of the present invention. Specifically, a data processing system 52 is shown which may be deployed either on drone 2 or EMI detection platform 8. As shown in FIG. 3, data processing system 52 includes a pulse width modulated (PWM) waveform generator 54 that converts a digital signal input from an alternating current (AC) 53 source into an arbitrary multi-frequency component waveform. In a preferred embodiment, waveform generator 54 generates a pulse width modulated output signal having multiple frequency components which are input as a multi-frequency current signal into the windings of transmitter coil 4. Using a source signal comprised of multiple frequency components results in more comprehensive location information because responses are detected and recorded for each corresponding input frequency. The different frequencies induce responses at different layers in the volume being examined below the transmitter/receiver coil system. In general, lower frequencies induce responses in targets that are deeper within the volume, while higher frequencies induce responses in targets closer to the surface.

In this manner, so-called frequency depth sounding occurs wherein multiple frequencies are used to see further into the region below a sensor. Each frequency in a frequency-domain system models a different layer of the conductive earth below the transmitter/receiver pair. Low frequency signals look deeper into the earth, while high frequency signals can only travel short distances and sees only shallow structures. Higher frequency signals are more practical for detecting mines and UXO for two reasons. First, higher frequency signals induce target responses at shallower volume depths where mines and UXO typically reside. Additionally, higher frequency signals exploit the dielectric properties of less conductive materials, commonly found in explosives, which are consequently detectable.

The multi-frequency signal generated by waveform generator 54 induces a primary magnetic field having corresponding multi-frequency characteristics that is transmitted from transmitter coil 4. Among the multiple frequency components, high-frequency signals exploit the dielectric properties of less conductive materials, enabling the system to detect dielectric materials such as explosives. Additionally, a broad range of frequencies allows for a broad range of depths to be examined. The primary magnetic field induces eddy currents in targets contained within the ground volume below the detector that in turn generate a secondary, or response magnetic field which is detected by measuring the electromotive force, or electric potential in receiver coil 5 as receiver coil 7 follows transmitter coil 4 over the sampled location. Receiver coil 5 detects the secondary magnetic field as a percentage of the primary field. The resulting induced secondary magnetic field is preferably recorded at a sampling rate of 30 times per second for a 60 Hz power supply on a separate tape or other data recording media according to fiducial numbers.

Data processing system 52 further includes processing means in the form of a microprocessor 55 and a digital signal processor (DSP) 56. In accordance with the depicted embodiment, the induced electromotive force generated from the secondary magnetic field is converted to a digital signal by an analog-to-digital (A/D) converter 58 before being received and processed by DSP 56 and microprocessor 55 which then compare the phase and amplitude of the current from the transmitter coil with the phase and amplitude of the induced electromotive force from the receiver coil to deduce corresponding detected secondary to primary magnetic field ratio from which parameters such as conductivity and depth can be extracted.

The responses are recorded within processor memory or a local storage device 51 as a ratio of the secondary field to the primary field. A wireless network interface 59, as an RF transmission interface, may be utilized to transmit field-collected data from onboard data processing system 52 to remote networks or computers where the data may be processed in accordance with the post-collection processing techniques disclosed herein. In a preferred embodiment, the collected field data is processed using a modified Marquardt-Levenberg type nonlinear least squares inversion algorithm applied to a multiple-layer model, which will convert the detected response to conductivity values at corresponding depths for each latitude/longitude collection point as determined by GPS receiver 16. Once the data has been successfully inverted to conductivity and depth values at each collection point, contour graphs of conductivity vs. latitude/longitude and corresponding depth vs. latitude/longitude will be used to precisely map the mine locations. Using a laptop PC, this least squares algorithm can process a line of 477 data points in approximately 60 seconds. Visualization can be performed using any commercial plotting software program.

The dual-frequency GPS system (airborne version), comprising GPS receiver 16, is used to record the data collection point lateral position to an accuracy of 1 cm and the corresponding altitude to an accuracy of 2 cm. The GPS data collected at each acquisition site will be recorded on a tape according to fiducial numbers. Maps of the area can be generated to show conductivity and depths at each latitude/longitude.

Combination of GPS data with secondary field data will be performed offsite by matching fiducial numbers. Further analysis will be performed using a modified Levenber-Marquardt algorithm applied to a multiple-layer model, which will convert the detected response to conductivity values at corresponding depths for each latitude/longitude collection point. Once the data has been successfully inverted to conductivity and depth values at each collection point, contour graphs of conductivity vs. latitude/longitude and depths vs. latitude/longitude will be used to precisely map the mine locations.

In accordance with a preferred embodiment, a modified Marquardt-Levenberg type nonlinear least squares inversion algorithm is utilized to estimate values for the model parameters, using a multiple-layer forward algorithm to compute the frequency-domain responses to a signal transmitted by a horizontal coplanar loop-loop orientation, and compares these responses to the actual measured data using a trust region approach. The inverse algorithm then uses the discrepancies between predicted and actual to improve its guess for the parameters. This procedure is iterated to improve the estimates. The forward algorithm computes the Hankel functions using a method of weighting the zeroes of the Bessel function. The model can be modified for two to ten layers with the horizontal coplanar loop-loop system. The processing time for this algorithm applied to three layers is approximately 60 seconds for 480 data points for a six-frequency detection signal.

The collected data are processed using a modified Marquardt-Levenberg type nonlinear least squares algorithm, which estimates values for the model parameters, uses a forward model to predict the response to a signal transmitted by the source, and compares this response to the actual measured data. The algorithm then uses the discrepancies between predicted and actual to improve its guess for the parameters. This procedure is iterated to improve the estimates. The forward algorithm computes the Frischknecht integral by computing the Hankel functions using a method of weighting the zeroes of the Bessel function.

The multiple-layer forward algorithm computes the frequency-domain responses for a horizontal coplanar loop-loop orientation by computing the Hankel functions using a method of weighting the zeroes of the Bessel function. The subroutine can be modified for two to ten layers with a horizontal coplanar loop-loop system.

If the observed values for inphase are Iph(i) and for quadphase are Qph(i) at each frequency, i, then let a forward algorithm take model x and compute the corresponding inphase value for the model x at each frequency i, Ifr[i,x], and quadphase value for the model x at each frequency i, Qfr[i,x]. The least squares residual function is $$r(x) = \tfrac{1}{2}\Sigma((Iph(i) - Ifr[i,x])^2 + (Qph(i) - Qfr[i,x])^2)$$

where the sum is over the frequencies used
The Marquardt-Levenberg type nonlinear least squares inversion algorithm is an IMSL subroutine that is used to produce a series of models $x_k$ that converges to an approximate minimizer of the residuals r(x). This algorithm updates a model $x_k$ to $x_{k+1} = x_k + p_k$ by a trust region approach that seeks $p_k$ as the solution to $$\min_p \|J_k p + r(x_k)\|^2$$

subject to $$\|p_k\| \leq \Delta,$$

where $\Delta$ is the radius of the trust region and $J_k$ is a finite difference approximation to the Jacobian of r(x) at $x_k$. The minimum will be a quasi-Newton step $$J_k^T J_k p_k = -J_k^T r(x_k)$$

if $p_k$ is within the trust region so that $\|p_k\| < \Delta$. If $\|p_k\| = \Delta$, a line search method finds a scalar $\lambda > 0$ such that $$(J_k^T J_k + \lambda I) p_k = -J_k^T r(x_k).$$

The $\|p_k\| = \Delta$ case occurs when $x_k$ is far from a minimizer and $J_k^T J_k$ may have zero or near zero eigenvalues. The $\lambda I$ term in $(J_k^T J_k + \lambda I)$ increases the eigenvalues by an amount $\lambda$ and assures a positive definite coefficient matrix. Once a minimizer is approached, the $\|p_k\| < \Delta$ case takes control and the algorithm assumes the rapid convergence characteristics of traditional Gauss-Newton methods. Further explanation of data processing techniques applied to gathered AEM induction data is set forth in "Comparison Of MIM and Least Squares Inversions For Barataria Bay AEM Data"©, authored by Dr. Melissa Whitten Bryan. The content of "Comparison Of MIM and Least Squares Inversions For Barataria Bay AEM Data"© is incorporated in its entirety herein by reference.

Figure 4:
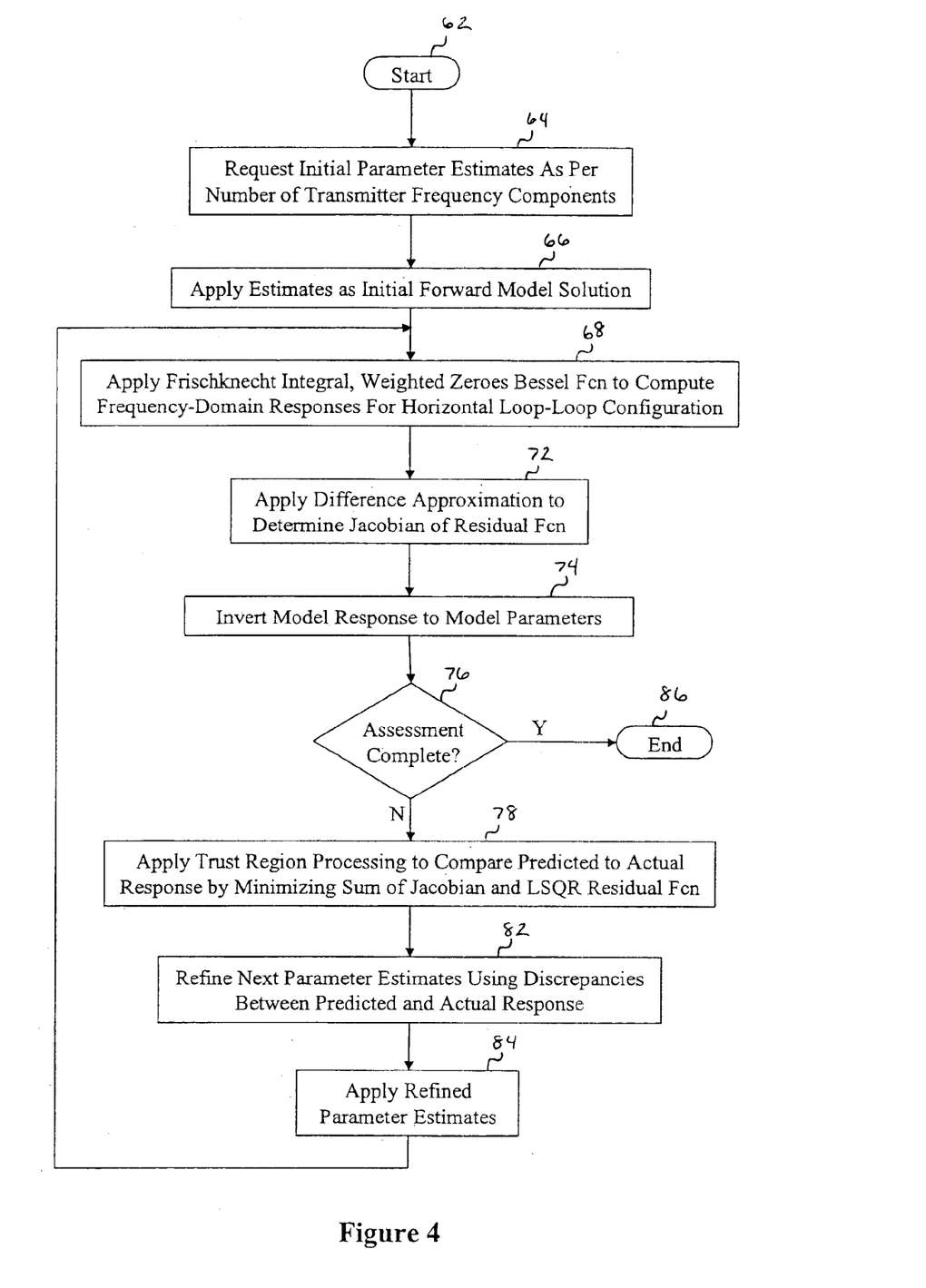
FIG. 4 is a high-level flow diagram depicting process steps utilized to obtain multi-layer field conductivity profiles from received field response data in accordance with one embodiment of the present invention.

Referring to FIG. 4, there is illustrated a high-level flow diagram depicting process steps utilized to obtain multi-layer field conductivity profiles from received electromagnetic induction field response data (i.e. data retrieved from the EMI response signals received by receiver coil 5) utilizing the modified Marquardt-Levenberg type nonlinear least squares inversion algorithm in accordance with one embodiment of the present invention. The process begins as shown at step 62 and proceeds to step 64 depicting one or more requests for initial parameter estimates, or guesses, based on the number of frequencies utilized in the EMI transmitter/receiver detection system. The initial parameter estimates (i.e., layer depths and corresponding conductivities) are applied as the initial forward model solution as illustrated at step 66. Next, as depicted at step 68 a forward model subroutine that can be modified for two to ten layers is utilized to compute the frequency-domain response of a signal transmitted by the source of a horizontal loop-loop configuration. The subroutine preferably computes the Frischknecht integral using a method of weighting the zeroes of the Bessel function.

Proceeding to steps 72 and 74, the Jacobian of the residual function is computed at a point using a finite difference approximation and an inversion method is utilized to invert the responses to the model parameters. If the current assessment is not complete, the resultant predicted response is compare with the actual measured data using a trust region approach that seeks to minimize the sum of the Jacobian and the least squares residual function as shown at steps 76 and 78. Next, as illustrated at steps 82 and 84, the discrepancies between the predicted response and the actual response is utilized to adjust the next set of parameter estimates which are again processed beginning at step 68 in an iterative manner.

The foregoing description discloses a compact A-EMI detection system that employs a magnetic shield to greatly reduce the size of the footprint and increase the ability to discriminate small objects as well as dramatically reduce the time required to detect and therefore clear mine fields. Sampling at a rate of 30 times per second and flying a speed of 17 mph, this system is capable of detecting mines or UXO at the rate of 10 acres per day. Using multiple input frequencies give more information about the volume being examined; therefore, a broader range of materials can be detected including dielectric materials such as explosives and landmines made using very little or no metal. Additionally, multiple depths can be examined in a volume to see objects buried at various depths. After processing using the modified Marquardt-Levenberg type nonlinear least squares algorithm, maps can be produced of conductivity vs. position as well as conductivity vs. depth.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

What is claimed is:

1. A electromagnetic induction detection apparatus comprising:
   a transmitter element that emits a primary magnetic field which induces a secondary magnetic field in an external body;
   a receiver element that receives the secondary magnetic field; and a magnetic shield disposed around said receiver element that limits the lateral footprint diameter of the secondary magnetic field observed by said receiver element.

2. The electromagnetic induction detection apparatus of claim 1, wherein said magnetic shield is constructed of magnetic field absorbant or magnetic field reflective material.

3. The electromagnetic induction detection apparatus of claim 1, wherein said magnetic shield is cone-shaped, said receiver element concentrically disposed at the narrow end of said cone-shaped magnetic shield.

4. The electromagnetic induction detection apparatus of claim 1, wherein said magnetic shield comprises an outwardly angled shield wall.

5. The electromagnetic induction detection apparatus of claim 3, wherein said outwardly angled shield wall is sloped to form an angle between the shield wall and the footprint surface within an open end of the magnetic shield from 28° to 90°.

6. The electromagnetic induction detection apparatus of claim 1, wherein said transmitter element is an inductive coil.

7. The electromagnetic induction detection apparatus of claim 1, wherein said receiver element is an inductive coil.

8. The electromagnetic induction detection apparatus of claim 1, wherein said transmitter element, said receiver element are disposed in a horizontal loop-loop configuration on a substantially rigid, non-conductive support platform.

9. The electromagnetic induction detection apparatus of claim 8, wherein said receiver element is mounted in a coplanar, displaced manner with respect to said transmitter element on said support platform such that said receiver element is substantially shielded from the primary magnetic field emitted from said transmitter element.

10. The electromagnetic induction detection apparatus of claim 8, wherein said transmitter element, said receiver element and said non-conductive support platform form a discrete electromagnetic induction detection apparatus that may be flown in a suspended manner below an aircraft.

11. The electromagnetic induction detection apparatus of claim 10, further comprising an aircraft that transportably positions said electromagnetic induction detection apparatus.

* * * * *